(12) United States Patent
Hettich

(10) Patent No.: US 10,047,776 B2
(45) Date of Patent: Aug. 14, 2018

(54) ANCHORING SYSTEM

(71) Applicant: Ludwig Hettich Holding GmbH & Co KG, Stramberg (DE)

(72) Inventor: Stefan Hettich, Schramberg (DE)

(73) Assignee: LUDWIG HETTICH HOLDING GMBH & CO KG, Schramberg (DE)

( * ) Notice: Subject to any disclaimer, the term of this patent is extended or adjusted under 35 U.S.C. 154(b) by 189 days.

(21) Appl. No.: 14/888,083

(22) PCT Filed: Apr. 9, 2014

(86) PCT No.: PCT/EP2014/057152
§ 371 (c)(1),
(2) Date: Oct. 29, 2015

(87) PCT Pub. No.: WO2014/177350
PCT Pub. Date: Nov. 6, 2014

(65) Prior Publication Data
US 2016/0108948 A1   Apr. 21, 2016

(30) Foreign Application Priority Data

May 2, 2013  (DE) .................. 10 2013 104 482
Aug. 30, 2013 (DE) .................. 10 2013 109 428

(51) Int. Cl.
*F16B 13/00* (2006.01)
*F16B 35/00* (2006.01)
(Continued)

(52) U.S. Cl.
CPC .............. *F16B 13/066* (2013.01); *E04B 1/41* (2013.01); *F16B 13/00* (2013.01); *F16F 15/02* (2013.01);
(Continued)

(58) Field of Classification Search
CPC .......... F16B 35/041; F16B 33/02; F16B 37/12
(Continued)

(56) References Cited

U.S. PATENT DOCUMENTS 1,005,780 A * 10/1911 Raber .................. B41J 5/26
267/175
1,462,925 A *  7/1923 Wilburger ............ B42F 13/02
267/179
(Continued)

FOREIGN PATENT DOCUMENTS

CH        679512      2/1992
DE        129865      9/1901
(Continued)

OTHER PUBLICATIONS

International Preliminary Report on Patentability for PCT/EP2014/057152, dated Nov. 12, 2015 (8 pages).
(Continued)

*Primary Examiner* — Flemming Saether
(74) *Attorney, Agent, or Firm* — Patent Law Works LLP

(57) ABSTRACT

The disclosure relates to an anchor system having an internally threaded anchor and a bolt or shaft screwed together with said anchor for holding an add-on component in a hole that is pre-drilled into a wall made of concrete or brick work, characterized in that the bolt of shaft comprises a coil spring which is wound suitably to the inner thread of the internally threaded anchor and screwed into said inner thread.

13 Claims, 3 Drawing Sheets

(51) Int. Cl.
*F16B 13/06* (2006.01)
*E04B 1/41* (2006.01)
*F16F 15/02* (2006.01)
*F16B 35/04* (2006.01)
*F16B 13/08* (2006.01)

(52) U.S. Cl.
CPC ......... *F16B 13/002* (2013.01); *F16B 13/0816* (2013.01); *F16B 35/041* (2013.01)

(58) Field of Classification Search
USPC ...................................... 411/438, 392, 16–18
See application file for complete search history.

(56) References Cited

U.S. PATENT DOCUMENTS

| | | | | |
|---|---|---|---|---|
| 2,095,918 | A * | 10/1937 | Cave | 403/189 |
| 3,905,643 | A * | 9/1975 | Lamkemeyer | B62J 1/02 297/212 |
| 3,942,329 | A * | 3/1976 | Babcock | E21D 21/0006 405/259.5 |
| 4,318,651 | A * | 3/1982 | Ragen | F16B 13/0808 411/342 |
| 4,432,683 | A * | 2/1984 | Polos | F16B 13/0808 411/340 |
| 4,653,132 | A | 3/1987 | Yamada | |
| 4,906,154 | A * | 3/1990 | Sheppard | F16J 15/00 267/33 |
| 8,920,093 | B2 * | 12/2014 | Hettich | F16B 5/0275 29/456 |
| 9,512,868 | B2 * | 12/2016 | Stempniewski | F16B 13/065 |

FOREIGN PATENT DOCUMENTS

| | | |
|---|---|---|
| DE | 1087408 | 8/1960 |
| DE | 7606255 | 2/1976 |
| DE | 8713708 | 11/1987 |
| DE | 60113420 | 6/2006 |
| EP | 2185829 | 5/2010 |
| JP | 8177823 | 7/1996 |

OTHER PUBLICATIONS

Office Action issued in German patent application 10 2013 109 428.7, dated Jan. 9, 2014 (6 pages).
International Search Report and Written Opinion for PCT/2014/057152, dated Jun. 16, 2014 (8 pages).

* cited by examiner

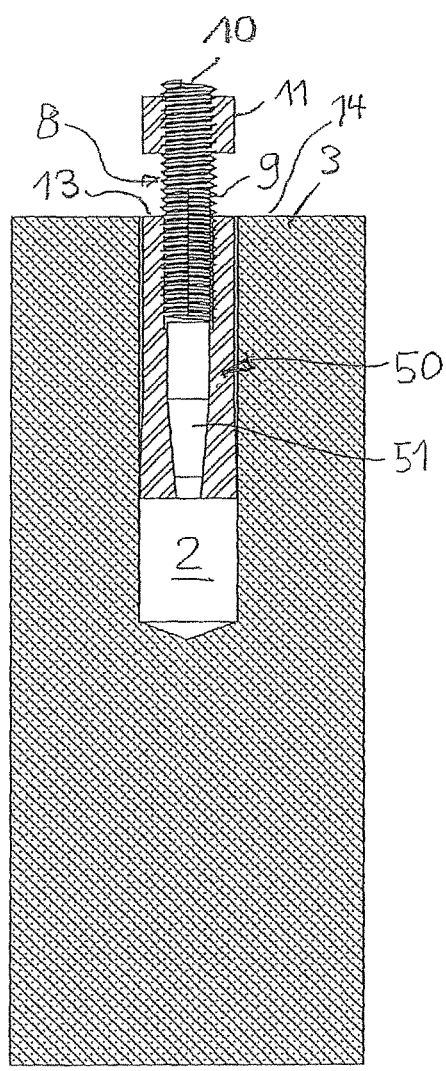
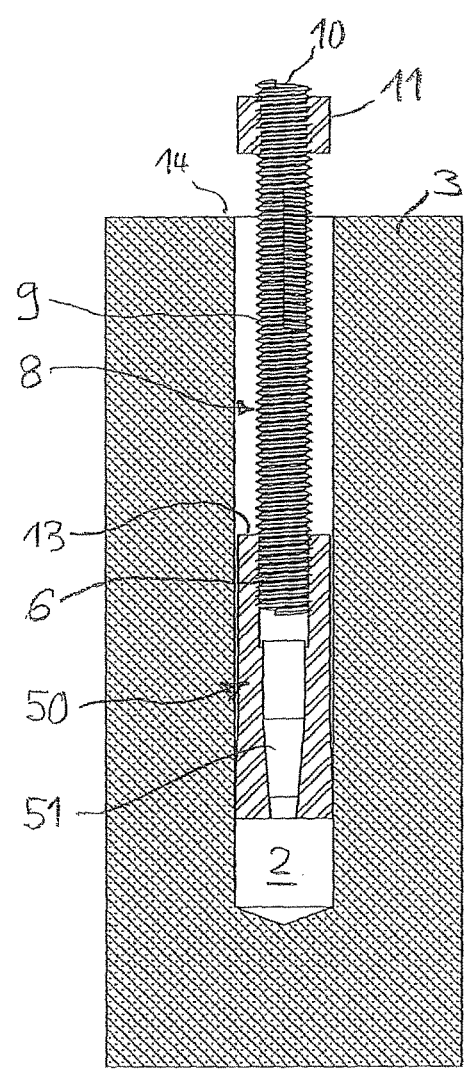

ANCHORING SYSTEM

CROSS REFERENCE TO RELATED APPLICATIONS

This application is a National Stage of International Application No. PCT/EP2014/057152 filed Apr. 9, 2014, entitled "Anchor System", which is hereby incorporated by reference in its entirety.

BACKGROUND

The disclosure relates to an anchoring system comprising an internally threaded anchor and a pin or shaft screwed to said internally threaded anchor for the fixture of an attachment inside a hole, which hole has been pre-drilled in a wall made of concrete or brick. Internally-threaded anchors of such anchoring systems are known in the art for example from EP 2 185 829 B1.

Further known in the art is an anchoring system of the above-mentioned type (DE 601 13 420 T2), wherein the pin or shaft has a first external thread for screwing into a bone and a second external thread, which is interlaced with the first external thread, into which a coil spring is inserted, which coil spring is intended to eliminate play between the first external thread and an internal thread created in the bone substance by the first external thread.

Instances of failure caused by actual earthquakes and theoretical simulations have shown that today's anchoring systems cannot always withstand load peaks.

SUMMARY

Earthquakes can cause movements between attachments and walls both in the axial direction of the anchorage as well as transversely, which movements can lead to inadmissible tensile and bending stresses and thus to the fracture of conventional anchorages and consequentially to the collapse of buildings.

The object of the technology described in this disclosure is therefore to create an anchoring system of the type described at the outset which can withstand earthquakes. This object is achieved by claim 1, according to which a coil spring forms the substantial component of the pin or shaft for the purpose of carrying load.

According to a further innovative development of the technology it may suffice for the pin or shaft to be formed as a coil spring.

Another innovative development of the technology provides that the coil spring has outside the internally threaded anchor sufficient length for the yielding and flexing of the coil spring in any direction.

An anchoring system in accordance with the technology, on the basis of the resilience of the coil spring which is screwed to the internally threaded anchor such that it is practically free from play both in the axial direction of the screw anchor as well as in all directions transversely thereto, permits sufficient movement to prevent a fracture.

This also applies for a further embodiment of the technology in which a damping element inserted into the coil spring serves for vibration absorption in the case of impact loads as generated in the event of earthquakes.

Advantageous embodiments of the technology are specified in the further subclaims.

BRIEF DESCRIPTION OF THE DRAWINGS

The technology is explained in more detail in the following schematic drawings. The figures show as follows:

FIGS. 2 and 3 are partial sections as in FIG. 1 of modified embodiments;

DETAILED DESCRIPTION

Figure 1:
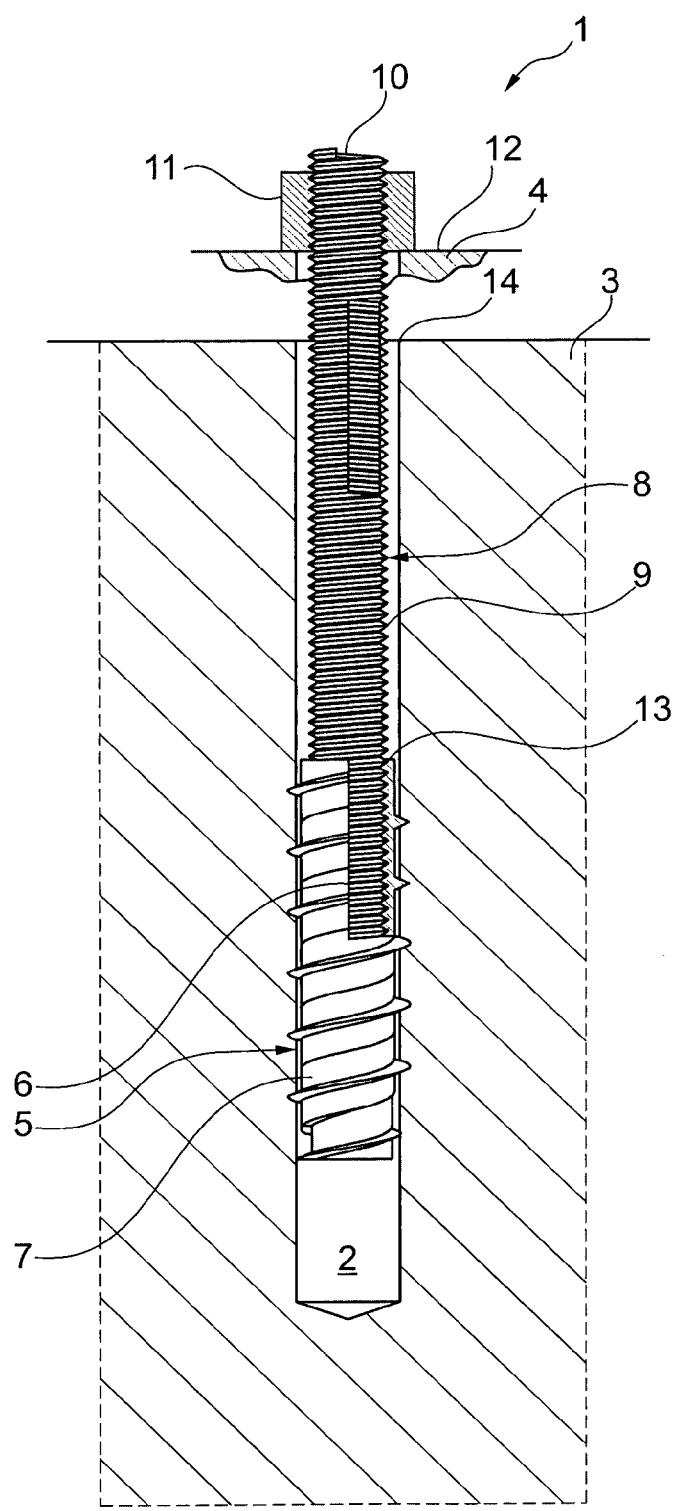
FIG. 1 is a partial section in the axial direction of a first embodiment of an anchoring system in accordance with the disclosed technology.

FIG. 1 shows an anchoring system in accordance with the invention which is inserted into a pre-drilled hole 2 in a wall 3 made of concrete or brickwork such as to safely hold an attachment 4 to said wall 3.

The anchoring system 1 comprises an internally-threaded anchor 5 having a metric internal thread 6 and an external thread 7, which forms a thread in the concrete around the hole 2.

Moreover the anchoring system has a coil spring 8, which is manufactured from spring steel and coiled according to the internal thread 6 of the internally threaded anchor 5 and whose windings in the un-loaded condition are disposed one next to the other such that the coil spring 8 forms an external thread 9.

Onto the mounting end 10 of the coil spring 8 is screwed a nut 11 having a metric thread that is identical to the internal thread 6 of the internally thread anchor 5. The nut 11 clamps the anchoring system 1 to the attachment 4.

In the case of the version shown, the internally threaded anchor 5 is screwed sufficiently deeply into the hole 2 that its top face 13 lies significantly lower than the edge 14 of the hole 2.

However it is understood that the internally threaded anchor 5 may be introduced to any depth in the pre-drilled hole, for example to a depth at which the top face 13 extends out of the hole 2 above its edge 14 or is flush with the same. It is only important that the coil spring 8, which is screwed play-free within the context of the usual thread tolerances to the internal thread 6 of the internally threaded anchor has sufficient length between the surface 12 of the attachment 4 and the upper edge 13 of the internal thread 6 for the elastic deflection and thereby yielding in any direction in the event of earthquake impacts.

There may also be spacing between the windings of the coil spring 8, wherein the internal thread 6 of the internally threaded anchor 5 shall be formed accordingly.

FIGS. 2 and 3 show embodiments of the disclosed technology, wherein the screw anchor 5 is replaced by an also known hammerset anchor or expansion anchor 50. The remaining portions of the anchoring system are identical to those of the version according to FIG. 1 and are thus provided with identical reference numbers and are not described again here. The hammerset 50 also includes an internal thread 6 for accommodating the coil spring 8. A difference between the embodiments according to FIGS. 2 and 3 exists in that the hammerset anchor 50 is inserted at different hole depths, namely, in accordance with FIG. 2, flush with the edge 14 of the hole 2 and, in accordance with FIG. 3, at a depth of around the same as the embodiment according to FIG. 1. The hammerset 50 is tapped into the hole 2 and is subsequently pressed against the hole wall by way of being spread apart with a mandrel 51.

The internally threaded anchor may also be differently embodied, as long as an internal thread is provided for reception of the coil spring 6.

Figure 4:
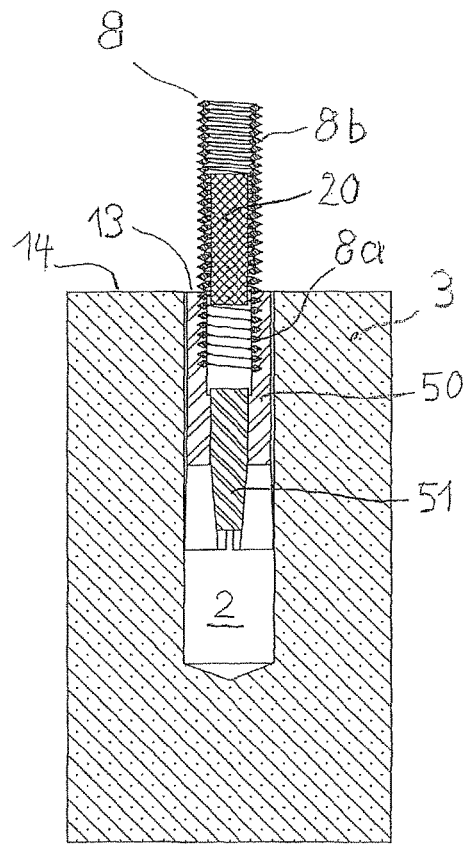

The embodiment according to FIG. 4 shows an anchoring system similar to that according to FIG. 2. In FIG. 4, the same reference signs are used for the same parts as in FIGS. 2 and 3. Here too the coil spring 8 has a constant external diameter throughout its length. However, at its inner drilled-hole end 8a it is coiled at a greater pitch than at its wall-outward portion 8b. The reason for this is that the internal thread formed by the coil spring may be formed by design for the screwed insertion of a threaded rod, not shown here, having a standard external thread. Since the internal thread of the expansion anchor may likewise satisfy standard dimensions and since it has a greater diameter than the internal thread of the coil spring, said internal thread of the expansion anchor shall be coiled in the drilled-hole end portion 8a to a correspondingly greater standard pitch.

In order to absorb vibrations of the coil springs 8 which can be caused e.g. by tremors produced by earthquakes, into the coil spring 8 is inserted a damping element 20 in the form of a cylindrical rod made of rubber plastic or another damping material.

In the case of the embodiment according to FIG. 4 the hammerset anchor 50 is introduced with its top face 13 flush with the edge 14 of the hole 2 in a like manner to the embodiment according to FIG. 2.

Figure 5:
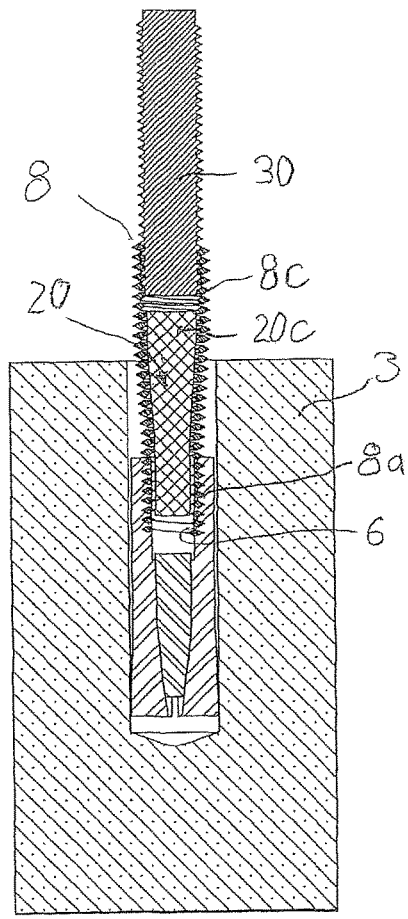
FIGS. 4 and 5 are two further embodiments of the anchoring system according to the disclosed technology.

In the case of the embodiment according to FIG. 5 however the hammerset anchor 50 is, in a like manner to the case of embodiment according to FIG. 3, recessed into the hole 2. In the case of this embodiment a coil spring 8 with its drilled-hole end portion 8a is screwed into the hammerset anchor 50. The wall-outward portion 8c of the coil spring 8 is widened such that an internal thread of the same pitch as in the portion 8a corresponding to the internal thread of the hammerset anchor is formed. Into this internal thread of the coil spring 8 is screwed a threaded rod 30 for the connection of an attachment not shown here to the wall 3. The external thread 31 of the threaded rod 30 has a pitch that corresponds to the pitch of the internal thread 6 of the hammerset anchor 50. Thus the pitch of the external thread of the coil spring 8 is identical here over its entire length.

As FIG. 5 shows, a damping element 20 extends within the coil spring 8, which damping element 20 has a thickening 20c which fits the widening 8c of the coil spring.

The features, which are disclosed in the above description, and the drawings may be important both individually and in any combination for implementing the invention in its various design.

The invention claimed is:

1. An anchoring system comprising:
   an internally-threaded anchor including an internal thread; and
   a pin or shaft screwed to the internally-threaded anchor for fixing an attachment in a hole pre-drilled in a wall made of concrete or brick, wherein the pin or shaft comprises a coil spring, which is coiled such that the coil spring fits the internal thread of the internally-threaded anchor and is screwed into the internal thread, wherein a threaded rod having a standard external thread for connecting the attachment to the wall is screwed into a wall-outward end of the coil spring.

2. The anchoring system according to claim 1, wherein the coil spring is outside the internally-threaded anchor and has sufficient length for yielding and deflecting of the coil spring in any direction.

3. Anchoring system according to claim 1, wherein the pin or shaft is formed as a coil spring.

4. The anchoring system according to claim 1, wherein a damping element plugs inside the coil spring.

5. The anchoring system according to claim 4, wherein the damping element is a cylindrical rod made of resilient material.

6. The anchoring system according to claim 1, wherein the coil spring has a wall-outward widened portion into which the threaded rod is screwed, and an internal thread having the same pitch as the internal thread of the internally threaded anchor into which a drilled hole end, un-widened portion of the coil spring is screwed.

7. The anchoring system according to claim 1, wherein the coil spring has a constant diameter along a length and a wall-outward portion that has an internal thread having a smaller pitch than in a portion that is screwed to the internally-threaded anchor.

8. The anchoring system according to claim 1, wherein a nut is screwed on a wall-outward end of the coil spring for fixing the attachment between the nut and the wall.

9. The anchoring system according to claim 1, wherein a head is fixed at a wall-outward end of the coil spring, the head having a drive for cooperation with a fastening tool.

10. The anchoring system according to claim 1, wherein the internally-threaded anchor has a suitable external thread for a thread-forming insertion into concrete.

11. The anchoring system according to claim 1, wherein the internally-threaded anchor is a hammerset anchor to be pushed into the hole.

12. The anchoring system according to claim 1, wherein the internally-threaded anchor is configured for introduction into the hole to a desired depth.

13. The anchoring system according to claim 1, wherein the internally-threaded anchor is configured for insertion flush with an edge of the hole.

* * * * *